Figure 1:
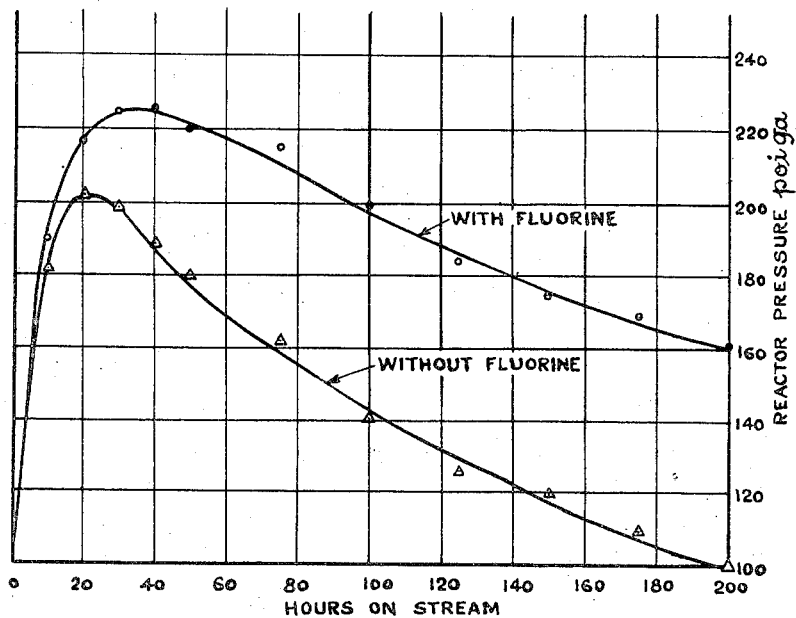

Inventors:
Donald Albert Howes
John Edward Morris
Frederick William Bertram Porter
By:

Attorneys.

2,800,429

DESULPHURISATION WITH A COBALT MOLYBDATE CATALYST CONTAINING FLUORINE, AND UNDER EQUILIBRIUM PRESSURE

Frederick William Bertram Porter, Sunbury-on-Thames, Donald Albert Howes, London, England, and John Edward Morris, Kuala Lumpur, Malaya, assignors to The British Petroleum Company Limited Application September 25, 1952, Serial No. 311,429

Claims priority, application Great Britain October 1, 1951

2 Claims. (Cl. 196—28)

This invention relates to catalysts for use in the reduction of the sulphur content of impure hydrocarbon materials, such as petroleum fractions, by treating the hydrocarbons with hydrogen in the presence of a catalyst under conditions of temperature and pressure such that organically combined sulphur in the hydrocarbons is converted into hydrogen sulphide which may readily be removed from treated hydrocarbons, and to desulphurisation processes using such catalysts.

Prominent among catalysts for this purpose are those containing cobalt and molybdenum, often in the form of cobalt molybdate but frequently with an excess of molybdenum oxide or (less often) of cobalt oxide. Such catalysts are commonly employed with the cobalt and molybdenum compounds dispersed upon a porous support such as alumina or bauxite; in such "supported" catalysts the support, in addition to increasing the activity of a given amount of cobalt and molybdenum by increasing the surface over which it is spread, may make an essential contribution to the nature of the catalyst activity, e. g. when the support is alumina or bauxite it may, in combination with the cobalt and/or molybdenum, promote the dehydrogenation of naphthenic hydrocarbons in the material being desulphurised, the hydrogen so formed being of benefit in the desulphurisation reaction.

We have now found that the presence of fluorine in a catalyst containing cobalt and molybdenum has a beneficial effect on its activity for desulphurisation mainly by virtue of its increased activity for dehydrogenation.

According to the invention therefore, a catalyst for the purpose described contains cobalt, molybdenum and fluorine as catalytic elements.

The invention is particularly applicable to supported catalysts containing cobalt and molybdenum and will hereinafter be described with reference to such supported catalysts.

According to a further feature of the invention, a catalyst for use in the hydrocatalytic desulphurisation of hydrocarbons consists of a mixture of the oxides of cobalt and molybdenum, or a chemical compound of cobalt, molybdenum and oxygen, or a mixture of one or both of said oxides with said compound, dispersed on a support, the catalyst containing fluorine in an amount from about 0.1 percent to 6 percent by weight of the catalyst.

Catalysts according to the invention may be produced in numerous ways. The fluorine may be introduced before, during or after the incorporation of the cobalt and/or molybdenum with the support. Thus, the support may be impregnated with an aqueous solution of hydrogen fluoride either before or after the incorporation of the cobalt and/or molybdenum with the support. Instead of using an aqueous solution of hydrogen fluoride, solutions of suitable fluorides, such as aluminum fluoride or ammonium fluoride, may be used, or the fluoride may be added with the cobalt and/or molybdenum by using a solution containing cobalt and/or molybdenum, and fluorine. The support may be in the form of wet gel, granules or pellets and is dried, and if necessary roasted, after each and every impregnation. Alternatively, with wet gel, the catalyst components may be added together or separately in any order using either their solid salts, e. g. cobalt nitrate, ammonium molybdate, cobalt fluoride, aluminum fluoride, or their solid oxides, molybdenum trioxide, cobalt oxide, after which the whole material is dried and roasted.

Instead of using wet methods the various components may be pelleted or agglomerated together using such solid materials as, for example, cobalt fluoride, molybdenum trioxide and alumina or cobalt oxide, molybdenum oxide and alumina after treatment with hydrogen fluoride.

Specific methods of preparing the catalyst are as follows:

(1) Activated alumina or bauxite is impregnated with a solution of hydrogen fluoride, dried and, if necessary, roasted. The impregnated support is then impregnated with an ammoniacal solution of cobalt nitrate and ammonium molybdate, dried and roasted. Alternatively, the impregnated support may be impregnated with ammonium molybdate solution, dried and roasted, and then impregnated with cobalt nitrate solution, dried and roasted again.

(2) Activated alumina or bauxite is impregnated with an ammoniacal solution of cobalt nitrate and ammonium molybdate, dried and roasted, and the impregnated support is then impregnated with dilute aqueous hydrogen fluoride, dried and again roasted.

(3) Activated alumina or bauxite is impregnated with ammonium molybdate solution, dried and roasted, then impregnated with dilute aqueous hydrogen fluoride, dried and, if necessary, roasted, and finally impregnated with cobalt nitrate solution, dried and roasted.

(4) Activated alumina or bauxite is impregnated with cobalt nitrate solution, dried and roasted, then impregnated with dilute aqueous hydrogen fluoride, dried and, if necessary, roasted, and finally impregnated with ammonium molybdate solution, dried and roasted.

(5) Activated alumina or bauxite is impregnated with an ammoniacal solution of cobalt fluoride, dried and roasted, and then impregnated with a solution of ammonium molybdate, dried and roasted.

(6) Activated alumina or bauxite is impregnated with an ammoniacal solution of cobalt fluoride and ammonium molybdate, dried and roasted.

It is advisable to keep the roasting temperature at all times as low as possible consistent with securing reaction between the various constituents, in order to limit the conversion of $\gamma$ to $\alpha$ alumina which tends to occur at higher temperatures and for the same reason to limit the temperature similarly when the catalyst is regenerated. We have found 550° C. to be a suitable temperature for these roasting operations.

A catalyst prepared in the manner described will contain its cobalt and molybdenum in a fully oxidised form, but it is often advisable, in order to obtain the best activity from the catalyst, partially to reduce the catalyst (and in particular to reduce $MoO_3$ to $MoO_2$) and this can conveniently be done by heating in the presence of hydrogen (e. g. at 780° F. and 100 p. s. i. hydrogen pressure until hydrogen ceases to be absorbed) where the catalyst will not receive an equivalent treatment in its use for desulphurising. Moreover, the hydrogen sulphide produced in the desulphurisation reaction tends to convert a part of the oxides present in the catalyst into sulphides with elimination of water, but such conversion has little effect on the activity of the catalyst, and our invention applies to such partially sulphided catalysts as well as to those which are unsulphided at the commencement of their use for desulphurisation. Indeed, we have found pretreatment with hydrogen sulphide gas at 100 p. s. i. g. and 780° F. to be an effective alternative to pretreatment with hydrogen. These conversions and pretreatments have as far as can be determined no effect upon the fluorine which increases the activity of the catalyst as a whole. Catalysts prepared according to our invention may be used in the well-known hydrofining process in which a hydrocarbon feedstock containing sulphur compounds is passed over the catalyst at a temperature usually in the range 600–900° F. and in the presence of added hydrogen. It is especially effective in the autofining process as described in United States Patents Nos. 2,573,726 and 2,574,445–2,574,451, inclusive, in which the catalyst and the conditions are chosen so that sufficient hydrogen for desulphurisation is produced by dehydrogenation of naphthenic hydrocarbons present in the feedstock to aromatic hydrocarbons, without the necessity of supplying hydrogen from an extraneous source and without deleterious side reactions taking place. We have found, in particular, that in this process a catalyst prepared according to the present invention will achieve a considerably more complete desulphurisation than a similar one from which the fluorine is omitted, when the two catalysts are used under the same conditions but allowing all the hydrogen produced to remain in the system. This type of operation is known as equilibrium pressure operation and is the subject of U. S. Patent No. 2,648,623. Alternatively, if all conditions except throughput and equilibrium pressure (the latter being dependent on the former) are kept the same with the two catalysts, that made according to our present invention and containing fluorine will give a similar extent of desulphurisation at a higher throughput rate than that not containing fluorine. Or alternatively, if all conditions are kept the same with the two catalysts and the pressure of the system maintained at a pressure less than the equilibrium pressure of the process using the catalyst not containing fluorine, for the same amount of desulphurisation the hydrogen produced by the catalyst containing fluorine will be in excess of that produced by the other.

The invention will now be described with reference to the following examples.

*Example I*

3000 millilitres (1750 grams) of 4–8 B. S. S. mesh dried alumina gel freshly activated by roasting for 2 hours at 550° C. was impregnated when cold with a solution of 157 grams of 40 percent w./w. hydrogen fluoride solution in 2400 grams of distilled water for 2 hours at room temperature in a closed polythene container. The residual solution was poured off the alumina which was drained and dried for 16 hours at 150° C. The dried alumina was then roasted for 2½ hours at 550° C. and cooled in air.

1000 millilitres (622 grams) of this fluorine-activated alumina was impregnated with 1100 millilitres of cobalt molybdate solution made by dissolving 220 grams of ammonium molybdate $(NH_4)_6Mo_7O_{24} \cdot 4H_2O$ in 375 grams of distilled water to which 95 grams of 0.88 S. G. ammonia solution had been added, adding a solution of 188 grams of cobalt nitrate $Co(NO_3)_2 \cdot 6H_2O$ in 50 grams of distilled water and taking up the resulting precipitate with 350 grams of 0.88 S. G. ammonia solution. The impregnation was carried out for 2 hours at a temperature of 50° C. The catalyst was drained in a Buchner funnel containing no filter paper, partially dried by sucking air over it, dried for 2 hours at 150° C. and roasted for 2 hours at 550° C. Analysis showed this catalyst to contain molybdenum, cobalt and fluorine in amounts of 11.5, 2.9 and 2.8 percent weight respectively expressed as $MoO_3$, $CoO$ and F.

This catalyst was used to remove sulphur from an Iranian gas oil by the autofining process. The gas oil of specific gravity 0.8500 at 60° C. contained initially 0.92 percent weight of sulphur as organic sulphur compounds. It had a boiling range from 415 to 670° F. in an Engler type distillation. The catalyst charge occupied a volume of 520 millilitres and weighed 377.5 grams and was pretreated with hydrogen at 100 p. s. i. g. and 780° F. prior to use. The gas oil was passed downwards over the catalyst bed at 1040 millilitres per hour at a temperature of 780° F. in the presence of hydrogen gas sufficient to bring the total pressure to 100 p. s. i. gauge and hydrogen gas was introduced with the gas oil feed at a rate of 96 litres (measured at 100 p. s. i. gauge) per litre of gas oil equivalent to 4000 cubic feet per barrel at N. T. P. After the initial start up, this gas was provided by recycling all the gaseous part of the products leaving the reactor. As the equilibrium pressure at first rose and then slowly fell, the same volume of recycle gas measured at the varying pressures was introduced with the gas oil feed. The experiment was continued for 200 hours and during this period, the organic sulphur content of the liquid products ranged from 0.10 percent to 0.09 percent weight over the first 50 hours rising to 0.14 percent weight at 100 hours, 0.18 percent weight at 150 hours and 0.25 percent weight at 200 hours as shown in the table below.

The above process when repeated using a catalyst prepared from the same materials but having no fluorine incorporated in the support and having a molybdenum oxide content of 24.6 percent wt. and a cobalt oxide content of 4.86 percent wt. gave liquid products of which the organic sulphur content ranged from 0.08 percent wt. to 0.11 percent wt. over the first 50 hours rising to 0.22 percent wt. at 100 hours, 0.35 percent wt. at 150 hours and 0.44 percent wt. at 200 hours as illustrated in the following table.

TABLE 1

| | Organic Sulphur Content Percent Wt. of Liquid Product at— | | | | | | | | | | |
|---|---|---|---|---|---|---|---|---|---|---|---|
| | 10 hr. | 20 hr. | 30 hr. | 40 hr. | 50 hr. | 75 hr. | 100 hr. | 125 hr. | 150 hr. | 175 hr. | 200 hr. |
| Catalyst with fluorine | 0.10 | 0.08 | 0.08 | 0.08 | 0.09 | 0.12 | 0.14 | 0.18 | 0.18 | 0.22 | 0.25 |
| Catalyst without fluorine | 0.08 | 0.07 | 0.08 | 0.09 | 0.11 | 0.15 | 0.22 | 0.29 | 0.35 | 0.37 | 0.44 |

Figure 2:
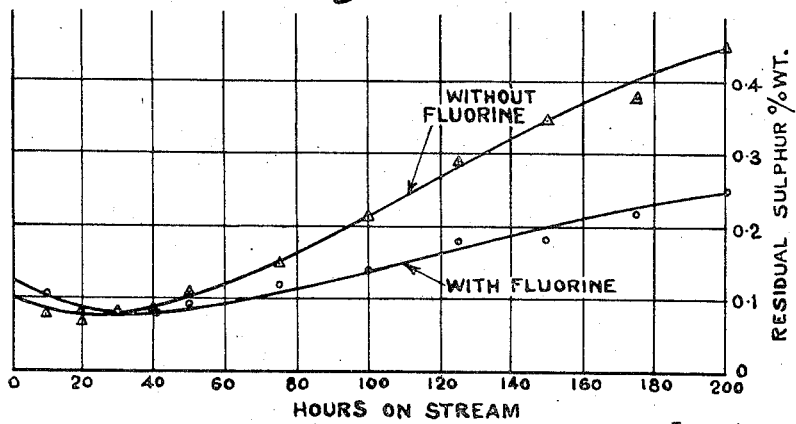

The results of the processes carried out in the above example are further illustrated in the accompanying drawings in which:

Figure 1 shows the relationship between reactor pressure and hours on stream, and Figure 2 shows the relationship between residual sulphur content and hours on stream.

*Example II*

3000 millilitres (1700 grams) of a dry alumina gel, freshly activated by roasting at 550° C. for two hours, were impregnated with a solution prepared by dissolving in water 400 grams of cobalt nitrate, $Co(NO_3)_2 \cdot 6H_2O$, and 500 grams of ammonium molybdate, $(NH_4)_6Mo_7O_{24} \cdot 4H_2O$ with sufficient ammonia to dissolve any precipitate formed, and made up to 2900 millilitres. After standing for two hours, the residual solution was drained off and the wet impregnated alumina gel dried for two hours at 150° C. and then roasted for a further two hours at 550° C. This impregnated alumina gel was then treated with a solution containing 190 grams of 40 percent weight by weight hydrofluoric acid solution in 2600 millilitres of distilled water for two hours at room temperature in a closed polythene container. The residual solution was drained off and the wet catalyst dried at 150° C. for two hours and then roasted at 550° C. for a further two hours. Analysis showed that this catalyst contained molybdenum, cobalt and fluorine in amounts of 11.1, 2.0 and 3.1 percent weight respectively, expressed as $MoO_3$, $CoO$ and $F$.

*Example III*

3100 millilitres (1655 grams) of dry alumina gel freshly activated by roasting for two hours at 550° C., were impregnated with a solution prepared by dissolving 215 grams cobalt fluoride, $CoF_2 \cdot 4H_2O$, and 490 grams of ammonium molybdate, $(NH_4)_6Mo_7O_{24} \cdot 4H_2O$, in ammonia and water, made up to 3000 millilitres. After two hours, the residual solution was poured off the alumina which was drained, and dried for 2 hours at 150° C. and roasted for three hours at 550° C. Analysis shows this catalyst to contain molybdenum, cobalt and fluorine in amounts of 8.9, 2.8 and 2.2 percent weight respectively, expressed as $MoO_3$, $CoO$ and $F$.

The catalyst as prepared in Example II was used to remove sulphur from an Iranian gas oil by the autofining process. The gas oil of specific gravity 0.840 at 60° F. contained initially 1.20 percent weight sulphur as organic sulphur compounds. It had a boiling range from 482° to 632° F. in an Engler type distillation. The catalyst charge occupied a volume of 520 millilitres and weighed 433 grams and was pretreated with hydrogen at 100 p. s. i. g. and 780° F. before use. The gas oil was passed downward over the catalyst bed at 1040 millilitres per hour at a temperature of 780° F. in the presence of hydrogen gas, sufficient to bring the total pressure to 100 p. s. i. g. and hydrogen gas was introduced with the gas oil feed at a rate of 48 litres (measured at 100 p. s. i. g.) per litre of gas oil, equivalent to 2000 cubic feet per barrel at N. T. P.

After the initial start-up, this gas was provided by recycling the gaseous part of the product leaving the reactor. As the equilibrium pressure at first rose and then slightly fell, the same volume of recycle gas measured at the varying pressures, was introduced with the gas oil feed. The experiment was continued for fifty hours and during this period the organic sulphur contents of the liquid products were as shown in the table below.

The catalyst as prepared in Example III was also used to remove sulphur from the same Iranian gas oil and under the same conditions as above, except that the catalyst charge was 520 millilitres and weighed 348 grams. The organic sulphur contents of the liquid products were as shown in the table below.

The above process, when repeated using a catalyst prepared from the same materials but having no fluorine incorporated in the support and having a molybdenum oxide content of 14.5 percent weight, and a cobalt oxide content of 2.7 percent weight, gave liquid products of which the organic sulphur contents were as shown in the table below.

TABLE 2

| | Organic Sulphur Content Percent wt. of Liquid Product at— | | | | |
|---|---|---|---|---|---|
| | 10 hr. | 20 hr. | 30 hr. | 40 hr. | 50 hr. |
| Catalyst with Fluorine prepared as in Example II | 0.03 | 0.03 | 0.03 | 0.05 | 0.07 |
| Catalyst with Fluorine prepared as in Example III | 0.07 | 0.07 | 0.09 | 0.11 | 0.13 |
| Catalyst without Fluorine | 0.16 | 0.24 | 0.35 | 0.41 | 0.42 |

We claim:

1. In an autofining process for the hydrocatalytic desulphurisation of petroleum hydrocarbons which is carried out as an equilibrium pressure operation by allowing all of the hydrogen produced to remain in the system, the improvement which comprises contacting the hydrocarbons with a catalyst comprising a support selected from the class consisting of activated alumina and bauxite, and incorporated with said support a catalytic agent selected from the class consisting of mixtures of the oxides of cobalt and molybdenum, chemical compounds of cobalt, molybdenum, and oxygen, and mixtures of at least one of said oxides with said chemical compounds, and fluorine in an amount from about 0.1 percent to 6 percent by weight of the catalyst.

2. In an autofining process for the hydrocatalytic desulphurisation of petroleum hydrocarbons which is carried out as an equilibrium pressure operation by allowing all of the hydrogen produced to remain in the system, the improvement which comprises contacting the hydrocarbons with a catalyst comprising a support consisting of activated alumina, and incorporated with said support a catalytic agent consisting of the oxides of cobalt and molybdenum, and fluorine in an amount from about 0.1 percent to 6 percent by weight of the catalyst.

References Cited in the file of this patent
UNITED STATES PATENTS

| | | |
|---|---|---|
| 1,890,438 | Pier | Dec. 6, 1932 |
| 2,310,278 | Connolly | Feb. 9, 1943 |
| 2,381,562 | Stewart | Aug. 7, 1945 |
| 2,499,255 | Parker | Feb. 28, 1950 |
| 2,510,189 | Nahin et al. | June 6, 1950 |
| 2,671,754 | De Rosset et al. | Mar. 9, 1954 |
| 2,687,370 | Hendricks | Aug. 24, 1954 |
| 2,691,623 | Hartley | Oct. 12, 1954 |
| 2,718,490 | Porter | Sept. 20, 1955 |
| 2,760,907 | Attane et al. | Aug. 28, 1956 |